(Model.)
T. W. BYRNES.
APPARATUS FOR DRAFTING GARMENTS.
No. 282,842. Patented Aug. 7, 1883.
4 Sheets—Sheet 1.
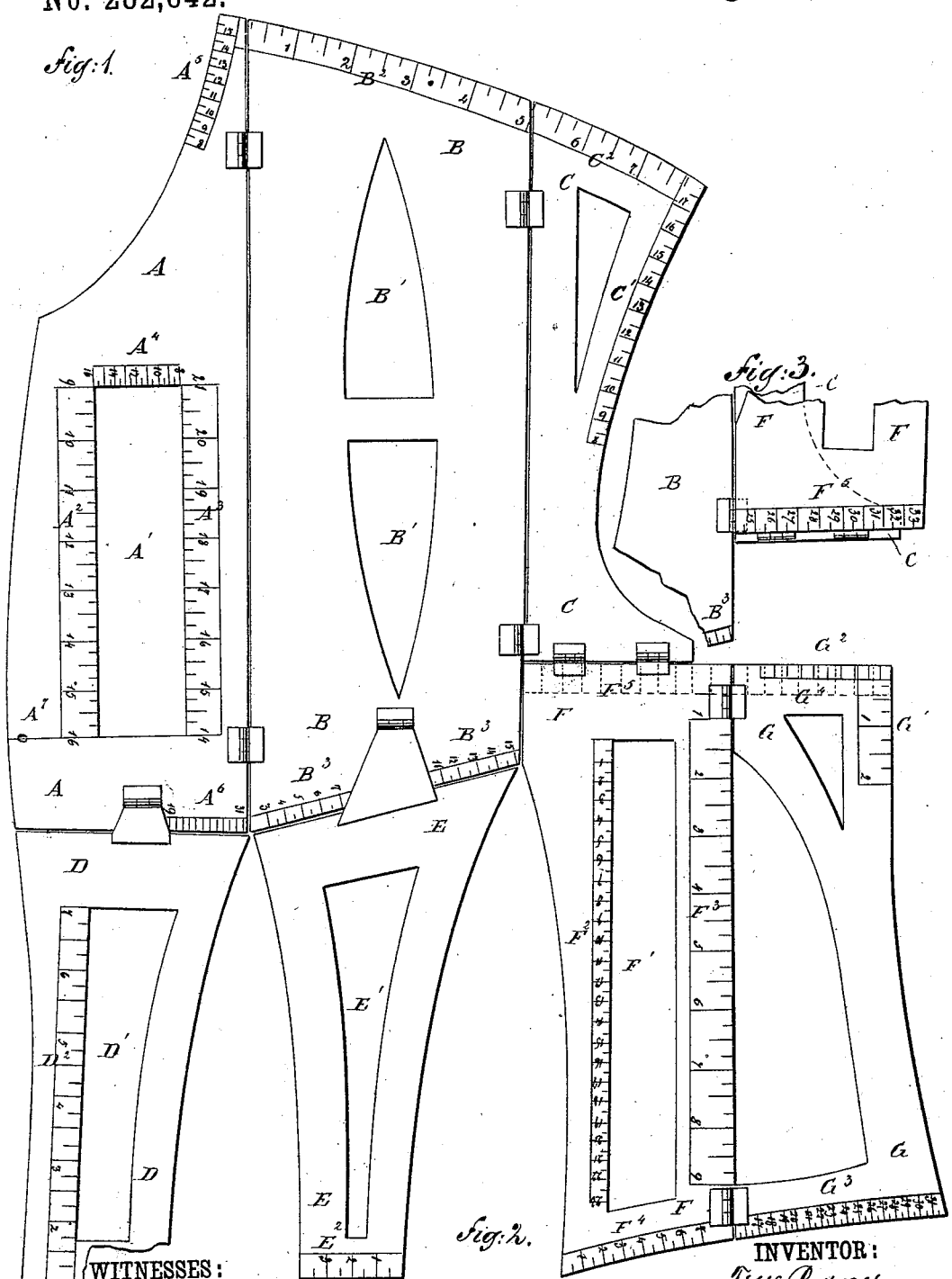
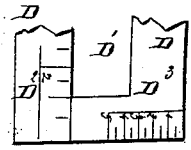

(Model.)

T. W. BYRNES.
APPARATUS FOR DRAFTING GARMENTS.

No. 282,842. Patented Aug. 7, 1883.

WITNESSES:

INVENTOR:
T. W. Byrnes
BY
ATTORNEYS.

(Model.)

4 Sheets—Sheet 3.

T. W. BYRNES.
APPARATUS FOR DRAFTING GARMENTS.

No. 282,842. Patented Aug. 7, 1883.

WITNESSES:

INVENTOR:
T. W. Byrnes
BY
ATTORNEYS.

(Model.)

4 Sheets—Sheet 4.

T. W. BYRNES.
APPARATUS FOR DRAFTING GARMENTS.

No. 282,842. Patented Aug. 7, 1883.

WITNESSES:

INVENTOR:
T. W. Byrnes
BY
ATTORNEYS.

UNITED STATES PATENT OFFICE.

THOMAS W. BYRNES, OF MANITOWOC, WISCONSIN.

APPARATUS FOR DRAFTING GARMENTS.

SPECIFICATION forming part of Letters Patent No. 282,842, dated August 7, 1883.

Application filed November 27, 1882. (Model.)

*To all whom it may concern:*

Be it known that I, THOMAS W. BYRNES, of Manitowoc, in the county of Manitowoc and State of Wisconsin, have invented a new and Improved Apparatus for Drafting Coats, Linings for Dress-Waists, and other Garments, of which the following is a full, clear, and exact description.

Reference is to be had to the accompanying drawings, forming part of this specification, in which similar letters of reference indicate corresponding parts in all the figures.

Figure 4:
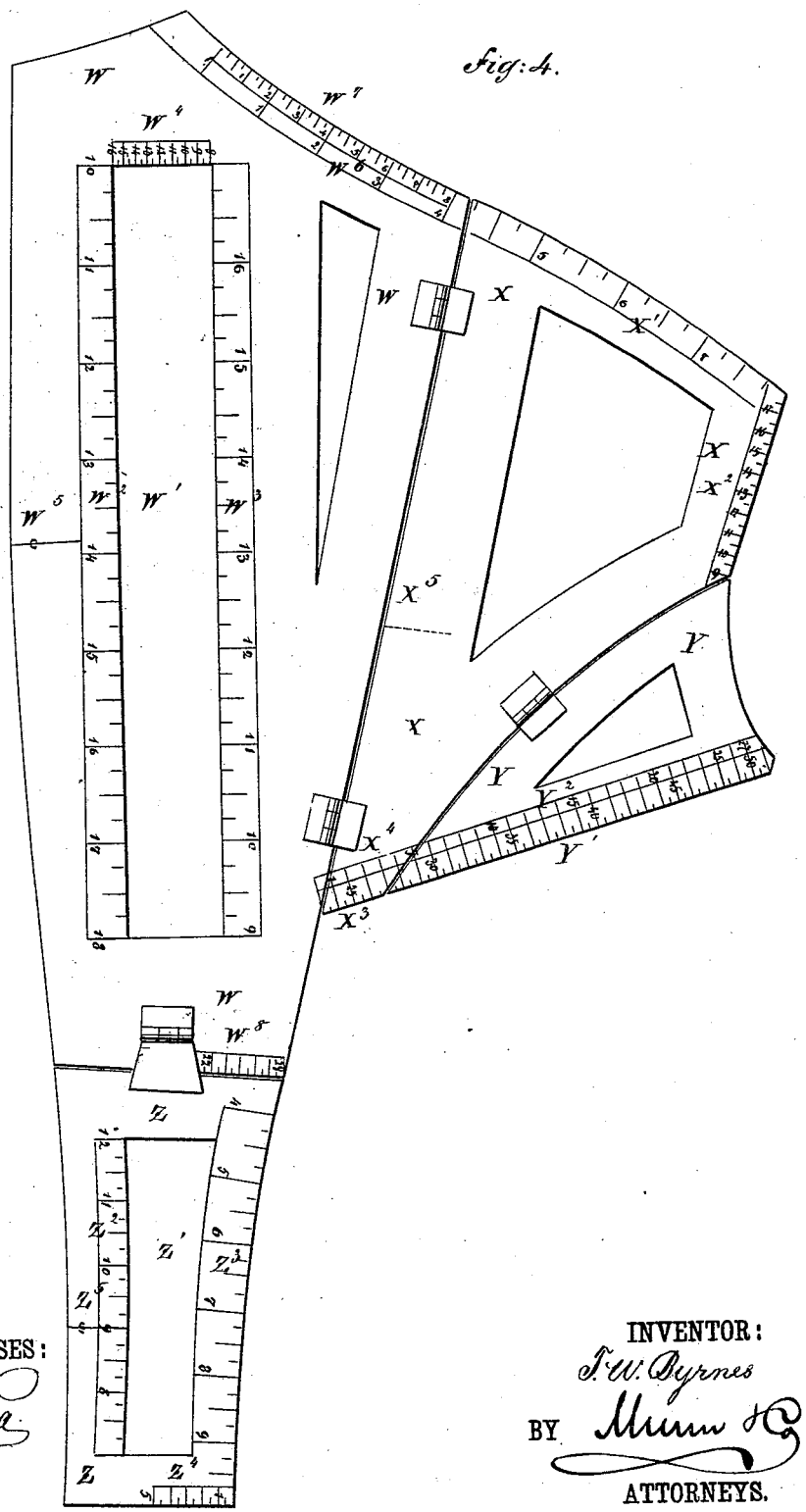
Figure 5:
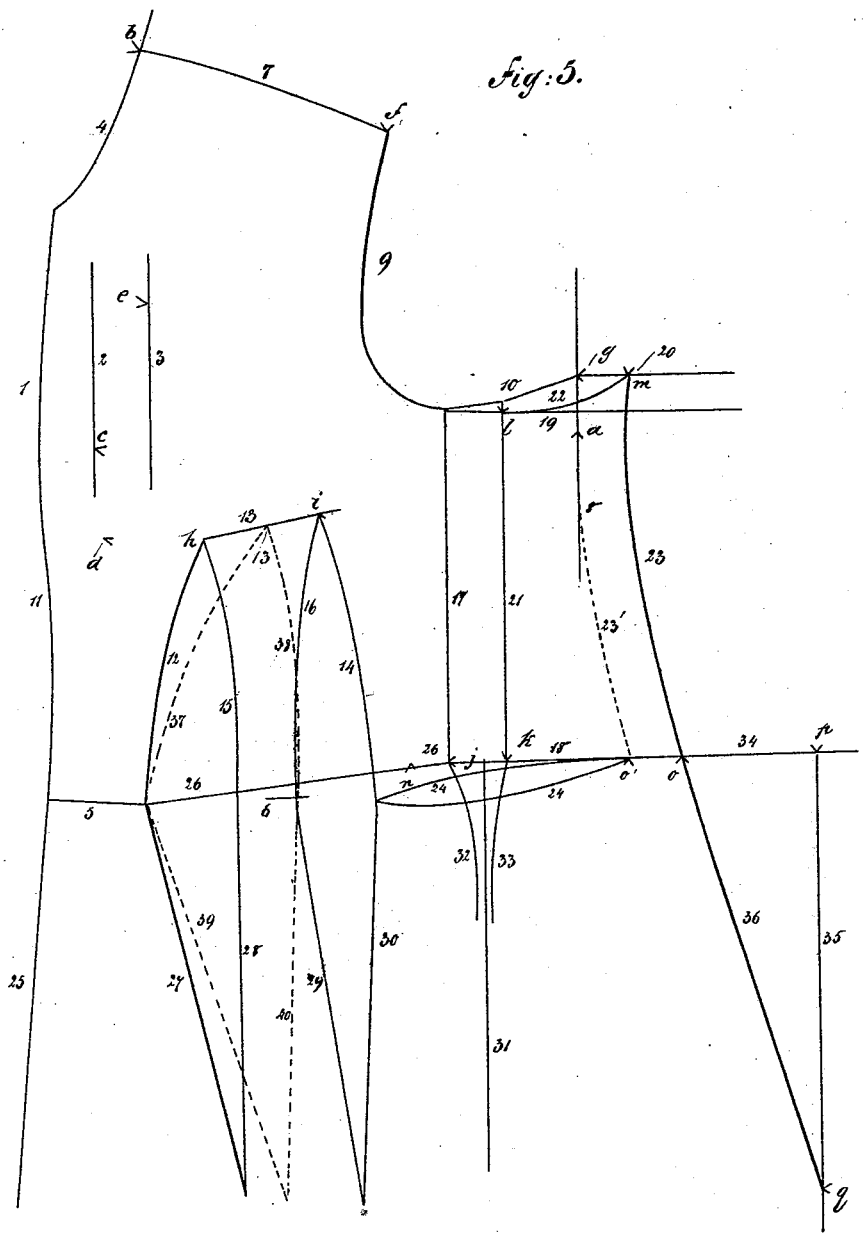
Figure 6:
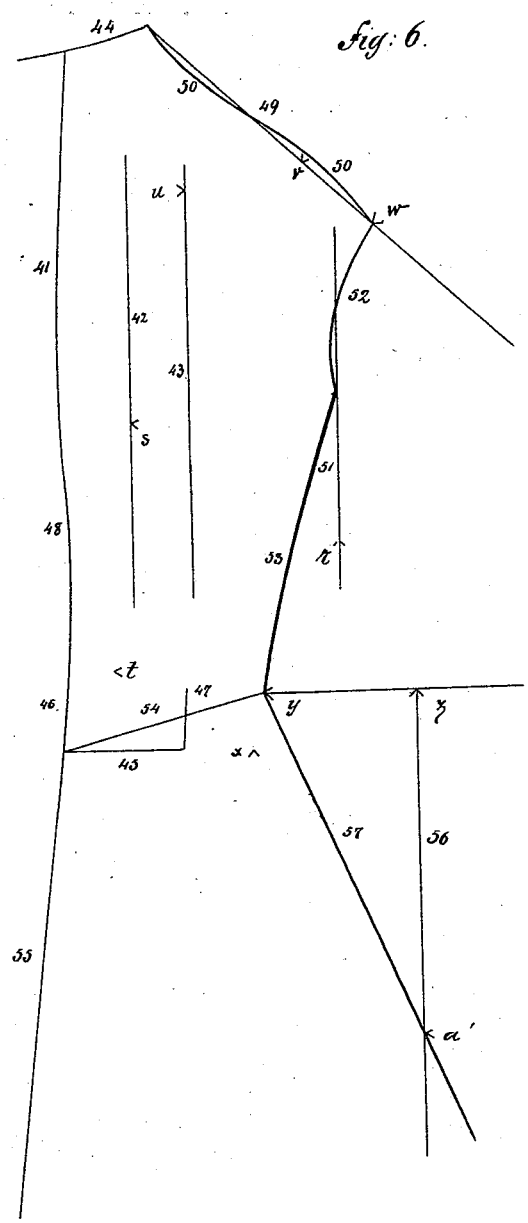

Figure 1, Sheet 1, is a plan view of the part of the apparatus for drafting the front of the coat or of a lining for a dress-waist. Fig. 2, Sheet 1, is a plan view of the lower left-hand corner of the part of the apparatus shown in Fig. 1. Fig. 3, Sheet 1, is a plan view of the reversed side of a part of the upper ends of the two lower right-hand sections of the apparatus. Fig. 4, Sheet 2, is a plan view of the part of the apparatus for drafting the back of a coat or a lining for a dress-waist. Fig. 5, Sheet 3, shows a draft for the front of a coat or a lining for a dress-waist. Fig. 6, Sheet 4, shows a draft for the back of a coat or a lining for a dress-waist.

The object of this invention is to facilitate the drafting of coats, linings for dress-waists, and other garments from measurements.

The invention consists in an apparatus having forms with scales thereon for drafting coats and linings for dress-waists, made in two parts, each formed of several sections hinged to each other at their adjacent edges, the said sections being made with straight and curved edges and with slots having straight and curved edges and provided with scales of division-marks along the said edges, as will be hereinafter fully described.

The part of the apparatus used in drafting the front of a coat or a lining for a dress-waist is made in seven sections, A B C D E F G, as shown in Fig. 1. The upper left-hand section, A, has the left-hand edge of its middle and lower parts slightly curved, to serve as a form in drafting the front line of a coat or dress-waist lining, and has the upper part of its left-hand edge concaved to serve as a form in drafting the neck of a coat or dress-waist lining. In the middle part of the section A is formed a long rectangular slot, A', to serve as a guide in adjusting the apparatus to the fabric. Upon the section A, along the left-hand edge, the right-hand edge, and the upper end edge of the slot A', and along the upper part of the neck-form are formed scales $A^2$, $A^3$, $A^4$, and $A^5$ of division-marks in inches and fractions of an inch. The section A is hinged at its straight right-hand edge to the straight left-hand edge of the section B, to the straight right-hand edge of which is hinged the straight left-hand edge of the section C. In the middle part of section B are formed two triangular slots, B', placed base to base, and having their side edges curved to adapt the said edges for use in drafting the darts. The right-hand edge of the section C is curved to adapt it to serve as a form in drafting the arm-eye. The upper edges of the three sections A B C are slightly curved in a continuous line to adapt them to serve as a form in drafting the shoulder-line. The lower edge of section A is straight and about at right angles with the length of the slot A'. The lower edge of the section B is inclined, as shown in Fig. 1. The section C is about an inch shorter than the right-hand edge of section B, and its bottom is at right angles with the said edge. Along the upper part of the curved right-hand edge of section C is formed a scale, C', of division-marks, numbered from the lower end upward. Along the upper edges of the sections B C is formed a scale of division-marks, $B^2$ $C^2$, numbered from left to right. Along the lower edge of the section B is formed a scale, $B^3$, of division-marks, numbered from left to right, and along the right-hand part of the lower edge of the section A is formed a scale, $A^6$, of division-marks, numbered from left to right. Upon the forward edge of the section A, at its point of greatest projection, is formed a mark, $A^7$.

To the lower end of the section A is hinged the upper end of the section D, the left-hand edge of which is curved to serve as a form for drafting the lower part of the front line of the garments. The right-hand edge of section D is curved to serve as a form in drafting the dart-lines. The lower end of the section D is straight, and in the middle part of the said section is formed a long slot, D', the right-hand edge of which is curved. The left-hand edge of the slot D' is straight, and along it formed a scale, $D^2$, of division-marks, numbered from the bottom upward. Along the right-hand part of the lower end of the section D is formed a scale, $D^3$, of division-marks, which are numbered from right to left.

To the inclined lower end of the section B is hinged the correspondingly-inclined upper edge of the section E. The left-hand and the right-hand edges of section E are curved to serve as forms in drafting dart-lines. The lower end of the section E is straight, and along it is formed a scale, $E^2$, of division-marks, numbered from right to left. In the middle part of the section E is formed a slot, $E'$, the side edges of which are curved to correspond with the adjacent edges of the said section.

To the lower end of the section C is hinged the upper end of the section F, the left-hand edge of which, from a point opposite the lower end of the right-hand edge of the section B, is curved to serve as a form for drafting dart-curves. The right-hand edge of section F is straight, being intended to serve as a straight-edge and ruler for general purposes in drafting, and the bottom edge slightly curved. In the middle part of the section F is formed a longitudinal slot, $F'$, along the left-hand edge of which, and along the right-hand edge of the said section, are formed scales $F^2$ $F^3$, of division-marks, which are numbered from the top toward the bottom, and along the lower end edge of the said section is formed a scale, $F^4$, of division-marks, numbered from left to right.

To the right-hand edge of section F is hinged the left-hand edge of section G, two inches of the upper part of the right-hand edge of which is straight and the remainder is curved to serve as a form for drafting the side line at the back. The left-hand side of the section G is recessed, and the edge of the said recess is curved, as shown in Fig. 1, to serve as a form in drafting curved lines. The lower edge of the section G is slightly curved to correspond with the lower edge of the section F. Along the upper part of the right-hand edge of the section G is formed a scale, $G'$, of division-marks, numbered from the top downward. Along the top edge of the section G is formed a scale, $G^2$, of division-marks, numbered from left to right, and along the bottom edge of the said section is formed a scale, $G^3$, of division-marks, numbered from left to right. Along the upper edges of the sections F G, upon the under side of the said sections, is formed a scale, $F^5$ $G^4$, of division-marks, which are numbered from left to right.

The part of the apparatus used in drafting the back of a coat or dress-waist is made in four sections, W X Y Z, as shown in Fig. 4. The upper left-hand section, W, has the forward part of its upper end inclined and slightly curved to serve as a form in drafting the neck. The rear part of the upper end of the section W is inclined and slightly curved to serve as a form in drafting the shoulder-line. In the middle part of the section W is formed a long rectangular slot, $W'$, along the left-hand edge of which is formed a scale, $W^2$, of division-marks, numbered from the top downward. Along the right-hand edge of the slot $W'$ is formed a scale, $W^3$, of division-marks, numbered from the lower end upward, and along the upper end of the said slot is formed a scale, $W^4$, of division-marks, numbered from right to left. The left-hand edge of section W is slightly curved outward to serve as a form in drafting the back line of the coat or dress-waist, and upon the said edge, at its point of greatest projection, is formed a mark, $W^5$, as shown in Fig. 4. Upon the right-hand part of the bottom edge of section W is formed a scale, $W^8$, of division-marks. The right-hand edge of the section W is inclined to the right, making the upper part of the said section wider than the lower part, and to the said edge is hinged the left-hand edge of the section X. The upper edge of section X is slightly curved reversely to the upper edge of the section W, and along the said upper edges is formed a scale, $W^6$ $X'$, of division-marks, which is numbered from left to right with large figures, as shown in Fig. 4. Along the upper edge of section W is formed a scale, $W^7$, of division-marks, which is numbered from left to right with small figures, as shown in Fig. 4. The upper part of the right-hand edge of section X is slightly inclined and curved, and along it is formed a scale, $X^2$, of division-marks, which are numbered from the lower end upward. The lower part of the right-hand edge of the section X is inclined to the left hand from its upper end, and is curved to serve as a form in drafting the upper part of a seam to the arm's eye in the back of a coat or dress-waist. To the lower part of the right-hand edge of the section X is hinged the curved left-hand edge of the section Y, the right-hand edge of which is curved to serve as a form in drafting the arm-eye. The lower edges of the sections X Y are inclined, and are in line with each other, and have two scales, $X^3$ $Y'$ and $X^4$ $Y^2$, of division-marks, both of which are numbered from left to right. The lower end of section W is slightly inclined, and to it is hinged the slightly-inclined upper end of the section Z. In the middle part of section Z is formed a slot, $Z'$, the side edges of which are curved, and along the left-hand edge of the said slot is formed a scale, $Z^2$, of division-marks, which are numbered from the lower end of the scale upward. The right-hand edge of the section Z is slightly concaved to serve as a form in drafting the lower part of a seam extending to the arm's eye, and is provided with a scale, $Z^3$, of division-marks, numbered from the upper end downward. The lower end of the section Z is straight and slightly inclined, and along its right-hand part is formed a scale, $Z^4$, of division-marks, numbered from right to left. The left-hand edge of section Z is slightly curved to correspond with the left-hand edge of the section W, and upon the said edge, a little below the center, is formed a mark, $Z^5$. Upon the under side of the left-hand edge of section X, at a distance from the lower end of the said edge equal to about one-third of its length, is formed a mark, $X^5$, as shown in dotted lines in Fig. 4.

In drafting garments with my improved apparatus, the usual measurements are taken in the ordinary manner.

In using the apparatus the material to be drafted is held firmly in place by pressing down on the sections at the edge, where a line is to be drawn or a measure is to be marked, thereby preventing the material from drawing or slipping while drafting the different lines and marking the different measures with a pencil or crayon.

Having thus described my invention, I claim as new and desire to secure by Letters Patent—

1. An apparatus for drafting coats, dress-waist linings, and other garments, made substantially as herein shown and described, and consisting of two parts, each formed of several sections hinged to each other at their adjacent edges, the said sections being made with straight and curved edges and with slots having straight and curved edges, and provided with scales of division-marks along the said edges, as set forth.

2. In an apparatus for drafting coats, dress-waist linings, and other garments, made in two parts, each formed of several sections hinged to each other at their adjacent edges, the main section of each part provided with a rectangular longitudinal slot, substantially as herein shown and described, whereby the said apparatus can be readily adjusted straight to a thread, as set forth.

3. In an apparatus for drafting coats, dress-waist linings, and other garments, the parts made in sections hinged to each other, substantially as herein shown and described, whereby any desired edge can be exposed for use and the apparatus can be compactly folded for transportation, as set forth.

4. In an apparatus for drafting coats, dress-waist linings, and other garments, made in two parts, the hinged sections provided with scales of division-marks along their edges and along the edges of slots formed in them, substantially as herein shown and described, whereby the ordinary measurements can be readily applied to the draft, as set forth.

THOMAS W. BYRNES.

Witnesses:
L. J. NASH,
GEO. B. GUYLER.